United States Patent
Hara et al.

(10) Patent No.: US 9,824,362 B2
(45) Date of Patent: Nov. 21, 2017

(54) POINT CALCULATING DEVICE AND METHOD FOR CALCULATING POINTS

(75) Inventors: Makiko Hara, Tokyo (JP); Takayuki Sakurai, Tokyo (JP)

(73) Assignee: Sony Corporation, Tokyo (JP)

( * ) Notice: Subject to any disclaimer, the term of this patent is extended or adjusted under 35 U.S.C. 154(b) by 704 days.

(21) Appl. No.: 12/310,093

(22) PCT Filed: Jul. 26, 2007

(86) PCT No.: PCT/JP2007/064661
§ 371 (c)(1),
(2), (4) Date: Feb. 9, 2009

(87) PCT Pub. No.: WO2008/018299
PCT Pub. Date: Feb. 14, 2008

(65) Prior Publication Data
US 2009/0281881 A1  Nov. 12, 2009

(30) Foreign Application Priority Data
Aug. 10, 2006 (JP) .................................. 2006-217946

(51) Int. Cl.
G06Q 30/00 (2012.01)
G06Q 20/06 (2012.01)
(Continued)

(52) U.S. Cl.
CPC ............. *G06Q 30/00* (2013.01); *G06Q 20/06* (2013.01); *G06Q 20/0655* (2013.01);
(Continued)

(58) Field of Classification Search
None
See application file for complete search history.

(56) References Cited

U.S. PATENT DOCUMENTS 5,347,451 A * 9/1994 Fujiwara .................. G07G 1/12
                                                    705/16
5,937,391 A * 8/1999 Ikeda et al. ................ 705/14.23
(Continued)

FOREIGN PATENT DOCUMENTS

JP    2002-170064    6/2002
JP    2002334285     11/2002
(Continued)

OTHER PUBLICATIONS

"The State of the Art in Electronic Payment Systems". Michael Steine. Network security group at the IBM Zurich Research Laboratory. CH-8803 Röschlikon, Switzerland. Sep. 1997. This.*

*Primary Examiner* — Victoria Vanderhorst
(74) *Attorney, Agent, or Firm* — K&L Gates LLP

(57) ABSTRACT

An object is to restrict the giving of points according to an object of payment for which payment was made with electronic money.

An electronic money server (FIG. 11) receives transaction information in which a breakdown of the amount of payment of an electronic money card used in one payment processing is recorded and breakdown information in which a breakdown of the amount of payment for each object of payment in this payment processing is recorded. The breakdown includes a normal item into which general products are classified, a tax-free item into which tax-free articles such as a postage stamp are classified, and a collected item into which public utility rates collected by an agency payment service are classified. Among these breakdown items, points are given to the amount of payment made for a normal item, and no points are given to the others. The electronic money server 5 identifies the amount of payment used for paying for a normal item product in the amount of payment made with the electronic money card by checking the breakdown (Continued)

information against the transaction information, and calculates the number of points for the amount of payment.

9 Claims, 14 Drawing Sheets

(51) Int. Cl.
| | | |
|---|---|---|
| *G06Q 20/36* | (2012.01) | |
| *G06Q 20/38* | (2012.01) | |
| *G06Q 30/02* | (2012.01) | |
| *G07F 7/08* | (2006.01) | |
| *G05B 19/418* | (2006.01) | |

(52) U.S. Cl.
CPC ......... *G06Q 20/363* (2013.01); *G06Q 20/387* (2013.01); *G06Q 30/0207* (2013.01); *G07F 7/0866* (2013.01)

(56) References Cited

U.S. PATENT DOCUMENTS

| | | | |
|---|---|---|---|
| 7,464,859 B1* | 12/2008 | Hawkins | ................... 235/379 |
| 2002/0177407 A1* | 11/2002 | Mitsumoto | ........... G06K 19/07 |
| | | | 455/41.1 |
| 2003/0018577 A1* | 1/2003 | Fukushima et al. | ............ 705/39 |
| 2003/0206560 A1* | 11/2003 | Cervini | .................. H01L 24/13 |
| | | | 370/516 |

FOREIGN PATENT DOCUMENTS

| | | |
|---|---|---|
| JP | 2003108851 | 4/2003 |
| JP | 2003115018 | 4/2003 |
| JP | 2005-174088 | 6/2005 |
| JP | 2005174368 | 6/2005 |
| JP | 2005234984 | 9/2005 |
| JP | 2005322190 | 11/2005 |
| JP | 2006172507 | 6/2006 |

* cited by examiner

FIG.5

USER DATABASE

| USER ID | NAME | . . . | ELECTRONIC MONEY FUNCTION PART ID | POINT MEMBER ID |
|---|---|---|---|---|
| 012-1123-5869 | ICHIRO YAMADA | . . . | 123456 (C CARD) | abcdef |
| | | | 345678 (A CARD) | WITHOUT ID |
| | | | 987654 (B CARD) | WITHOUT ID |
| 013-6543-8523 | TARO TANAKA | . . . | 654321 | klmnop |
| 011-9865-9674 | JIRO SAITO | . . . | 852147 | WITHOUT ID |
| . . . | . . . | . . . | . . . | . . . |

FIG.6

MEMBER STORE DATABASE

| OPERATOR | MEMBER STORE ID | MEMBER STORE NAME | TERMINAL ID | ... |
|---|---|---|---|---|
| TOKYO CONVENIENCE STORE KABUSHIKI KAISHA | 654874 | TOKYO CONVENIENCE STORE SHIBUYA BRANCH | 341354<br>324684<br>716358<br>... | ... |
| | 215447 | TOKYO CONVENIENCE STORE OSAKA BRANCH | ... | ... |
| | ... | ... | ... | ... |
| NANBU DEPARTMENT STORE GROUP KABUSHIKI KAISHA | 341354 | NANBU DEPARTMENT STORE SAPPORO BRANCH | ... | ... |
| | 648433 | NANBU DEPARTMENT STORE SHINJUKU BRANCH | ... | ... |
| | ... | ... | ... | ... |
| ABC ENTERTAINMENT | 654684 | ABC PINBALL PARLOR | 354876 | ... |
| ... | ... | ... | ... | ... |

FIG.7

POINT TABLE

| BREAKDOWN CLASSIFICATION | POINT RATE | COMMISSION RATE |
|---|---|---|
| NORMAL ITEM | 1 POINT/200 YEN | 3 % |
| TAX-FREE ITEM | 0 | 1 % |
| COLLECTED ITEM | 0 | 10 YEN/CASE |

FIG.8

TRANSACTION DATABASE

| ELECTRONIC MONEY FUNCTION PART ID | CHARGING | | | | PAYMENT | | | |
|---|---|---|---|---|---|---|---|---|
| | TERMINAL ID | TRANSACTION SEQUENCE NUMBER | DATE AND TIME | VALUE | TERMINAL ID | TRANSACTION SEQUENCE NUMBER | DATE AND TIME | VALUE |
| 123456 (C CARD) | | | | | 341354 | 00023 | 2006.01.05 13:30:02 | 800 |
| 345678 (A CARD) | | | | | 341354 | 00023 | 2006.01.05 13:30:02 | 100 |
| 987654 (B CARD) | | | | | 341354 | 00023 | 2006.01.05 13:30:02 | 600 |
| 876543 | ⋮ | | ⋮ | ⋮ | ⋮ | | ⋮ | ⋮ |
| ⋮ | | | | | | | | |

FIG.9

BREAKDOWN DATABASE

| TERMINAL ID | TRANSACTION SEQUENCE NUMBER | DATE AND TIME | BREAKDOWN | |
|---|---|---|---|---|
| 341354 | 00023 | 2006.01.05 13:30:02 | NORMAL ITEM | 600 |
| | | | TAX-FREE ITEM | 500 |
| | | | COLLECTED ITEM | 400 |
| . . . | | . . . | . . . | . . |

POINT CALCULATING DEVICE AND METHOD FOR CALCULATING POINTS

CROSS-REFERENCE TO RELATED APPLICATIONS

This application is a U.S. national stage application of International Application No. PCT/JP2007/064661, filed Jul. 26, 2007, claiming a priority date of Aug. 10, 2006, and published in a non-English language.

TECHNICAL FIELD

The present invention relates to a point calculating device and a method for calculating points, and, for example, relates to a device and a method that give points when electronic money is used.

BACKGROUND ART

Along with the popularization of electronic money, commercial transactions using electronic money have been increasingly popular.

In the commercial transactions using electronic money, electronic data having monetary value called value is stored in an IC card or the like, and the amount thereof is increased and decreased, whereby a transfer of the monetary value is carried out.

Incidentally, point service has become popular to retain the customers, for example.

In the point service, a points card in which a point member ID is stored is issued for a user, and, when the user buys a product, points are given and accumulated in such a way that they are brought into correspondence with the point member ID. The user can use a service corresponding to the number of accumulated points.

In recent years, a service that offers an IC card having an electronic money card function and a points card function such that points are given according to the amount of payment made with electronic money has become available.

As just described, as a technology to combine the commercial transactions using electronic money and the point service, there is a point service system tied to electronic money described in Patent Document 1 below. This technology allows points to be given when electronic money is used.

Patent Document 1: JP-A-2002-170064

DISCLOSURE OF INVENTION

Technical Problem

Restrictions on the giving of points are occasionally desired when payment of a particular object of payment, such as a public utility rate, is made with electronic money.

However, an electronic money center cannot restrict the number of points to be given according to an object of payment because, although it can collect an ID of an electronic money card and the amount of payment, it does not collect information on an object of payment, and gives points without exception regardless of object of payment.

Therefore, an object of the present invention is to restrict the giving of points according to an object of payment for which payment was made with electronic money.

Technical Solution

The present invention provides, in the invention according to claim 1, a point calculating device giving points, in an electronic money system configured by using a monetary value storage medium having ID information assigned thereto and storing monetary value as electronic data and payment means which performs payment processing by reducing the stored monetary value, according to the amount of payment made with the monetary value with the points associated with the ID information of the monetary value storage medium in which the monetary value was stored, the point calculating device including: payment amount obtaining means which obtains ID information and the amount of payment in the monetary value storage medium to which the ID information is assigned; breakdown information obtaining means which obtains breakdown information of an object of payment of the obtained amount of payment; point calculating means which identifies the amount of payment to which points are given by using the obtained breakdown information and calculates points for the amount of payment thus identified; and point outputting means which outputs the calculated points with the points associated with the ID information.

In the invention according to claim 2, provided is the point calculating device according to claim 1, wherein, in the electronic money system, a first type monetary value storage medium to which points are given when payment is made and a second type monetary value storage medium to which no points are given even when payment is made are used, and, when the first type monetary value storage medium and the second type monetary value storage medium are both used in one payment processing, the point calculating device calculates points with the assumption that the identified amount of payment to which points are given was paid by the first type monetary value storage medium up to a ceiling of the amount of payment made with the first type monetary value storage medium.

In the invention according to claim 3, provided is a method for calculating points, the method being performed by a point calculating device giving points, in an electronic money system configured by using a monetary value storage medium having ID information assigned thereto and storing monetary value as electronic data and payment means which performs payment processing by reducing the stored monetary value, according to the amount of payment made with the monetary value with the points associated with the ID information of the monetary value storage medium in which the monetary value was stored, wherein the point calculating device includes payment amount obtaining means, breakdown information obtaining means, point calculating means, and point outputting means, the method for calculating points including: a payment amount obtaining step of obtaining, by the payment amount obtaining means, ID information and the amount of payment in the monetary value storage medium to which the ID information is assigned; a breakdown information obtaining step of obtaining, by the breakdown information obtaining means, breakdown information of an object of payment of the obtained amount of payment; a point calculating step of identifying, by the point calculating means, the amount of payment to which points are given by using the obtained breakdown information and calculating points for the amount of payment thus identified; and a point outputting step of outputting, by the point outputting means, the calculated points with the points associated with the ID information.

Advantageous Effects

According to the invention, in order to achieve the above object, it is possible to restrict the giving of points according to an object of payment for which payment was made with electronic money.

BRIEF DESCRIPTION OF THE DRAWINGS

FIG. 5 It is a diagram of an example of a logical configuration of a user database.

FIG. 6 It is a diagram of an example of a logical configuration of a member store database.

FIG. 7 It is a diagram of an example of a logical configuration of a point table.

FIG. 8 It is a diagram of an example of a logical configuration of a transaction database.

FIG. 9 It is a diagram of an example of a logical configuration of a breakdown database.

Figure 1:
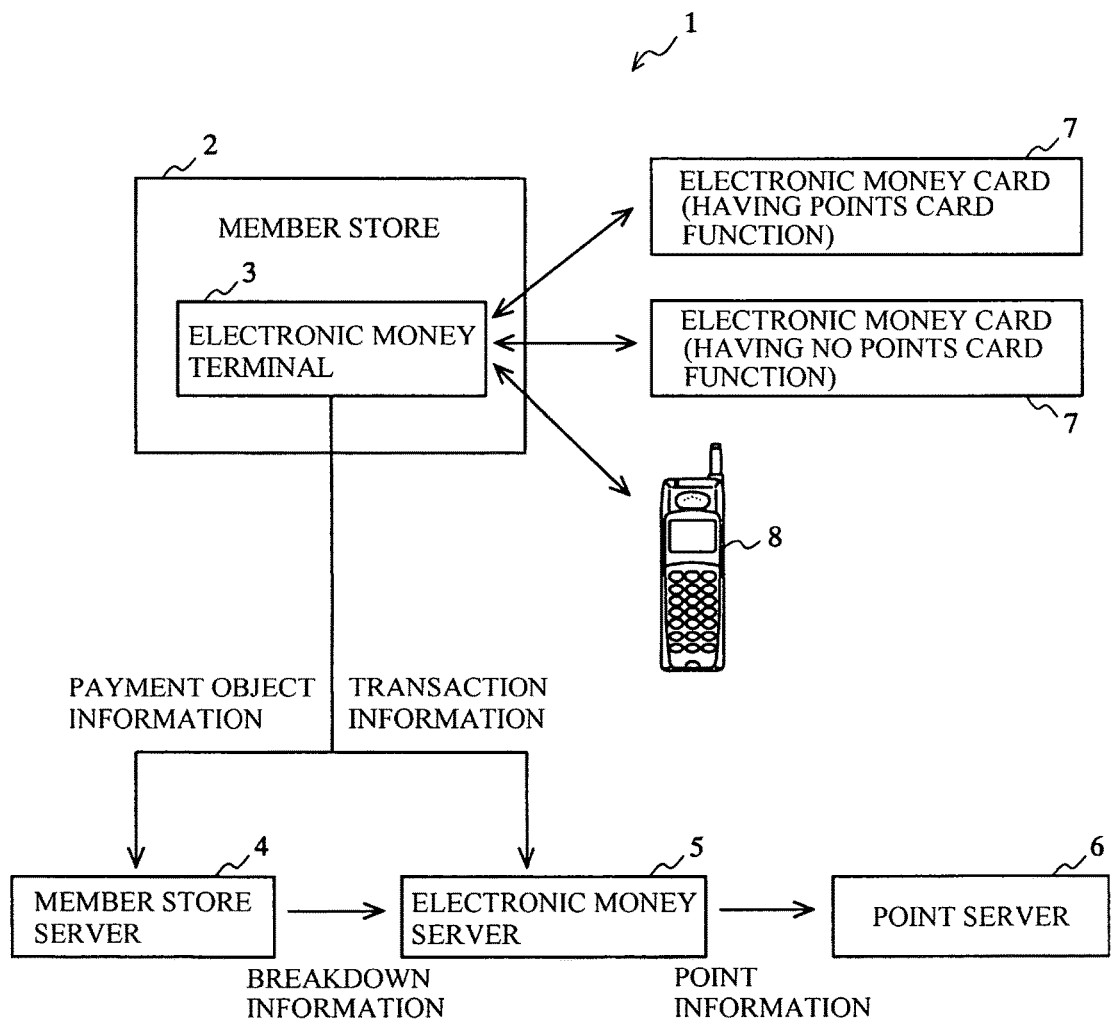
FIG. 1 It is a diagram for explaining a system configuration of an embodiment.

EXPLANATION OF REFERENCE 1 electronic money system
2 member store
3 electronic money terminal
4 member store server
5 electronic money server
6 point server
7 electronic money card
8 mobile phone

BEST MODES FOR CARRYING OUT THE INVENTION

(1) Summary of Embodiment

An electronic money server (FIG. 11) receives transaction information in which a breakdown of the amount of payment of an electronic money card used in one payment processing is recorded and breakdown information in which a breakdown of the amount of payment for each object of payment in this payment processing is recorded.

The breakdown includes a normal item into which general products are classified, a tax-free item into which tax-free articles such as a postage stamp are classified, and a collected item into which public utility rates collected by an agency payment service are classified.

Among these breakdown items, points are given to the amount of payment made for a normal item, and no points are given to the others.

The electronic money server identifies the amount of payment used for paying for a normal item product in the amount of payment made with the electronic money card by checking the breakdown information against the transaction information, and calculates the number of points for the amount of payment thus identified.

Moreover, when an electronic money card having the points card function and an electronic money card having no points card function are both used in one payment processing, the electronic money server allocates, to the electronic money card having the points card function, the largest possible amount of payment to which points are given to the advantage of the user.

For example, suppose that a C card has the points card function, and an A card and a B card do not have the points card functions. In this case, the electronic money server allocates, to the C card, 600 yen to which points are given as the amount of payment made with the C card up to a ceiling of 800 yen, which is the amount of payment made with the C card. If the amount of payment to which points are given is 1000 yen, it allocates 800 yen to the C card, and allocates the remaining 200 yen to the other electronic money card.

(2) Details of Embodiment

FIG. 1 is a diagram for explaining a system configuration of the embodiment.

An electronic money system 1 includes an electronic money terminal 3 installed in a member store 2, a member store server 4, an electronic money server 5, a point server 6, an electronic money card 7, a mobile phone 8, and the like.

The electronic money card 7 incorporates an IC chip and an antenna for communicating with the electronic money terminal 3, and can charge itself with value and make payment. Electric power for driving the IC chip is supplied from the electronic money terminal 3 wirelessly.

Here, value is a concept corresponding to money in the electronic money system 1, and is money amount information indicating the amount of monetary value as electronic data.

A management operator of the electronic money system 1 matches value with a currency by collecting, when issuing value, the currency for the corresponding amount of money from the user, and distributing it to the member store 2 which accepted payment with value according to the amount of payment.

Increasing the amount of value stored in the IC chip by issuing value is referred to as charging, and decreasing the charged value with the electronic money terminal 3 is referred to as making payment.

As the electronic money card 7, there are a card having the points card function (hereinafter, an electronic money card 7 having the points card function) and a card having no points card function (hereinafter, an electronic money card 7 having no points card function).

To the electronic money card 7 having the points card function, points according to the amount of payment are given when payment is made with value.

On the other hand, to the electronic money card 7 having no points card function, no points are given even when payment is made with value.

The electronic money card 7 having the points card function is offered as follows. For example, the management operator of the electronic money system 1 ties up with a point provider, and the point provider issues a points card having the electronic money card function to retain the customers.

The mobile phone 8 incorporates an IC chip for the electronic money card 7, and can charge itself with value and make payment in a manner similar to the electronic money card 7 by performing short-distance wireless communication with the electronic money terminal 3.

As is the case with the electronic money card 7, the mobile phone 8 can also be provided with the points card function.

The electronic money card function of the mobile phone 8 is performed by the IC chip as in the case of the electronic money card 7. Thus, hereinafter, the concept of the electronic money card 7 includes the mobile phone 8 incorporating the IC chip.

The member store 2 is a store where payment can be made with value by using the electronic money card 7. Although only one store is shown in the figure, there are a plurality of stores.

The member stores 2 include, in addition to a store having a fixed address, such as a convenience store and a restaurant, a mobile unit such as a taxi and a virtual store established on the Internet server.

Of these member stores 2, for example, in addition to selling products, a convenience store offers an agency payment service such as collecting public utility rates including water rates or sells tax-free articles such as a postage stamp on a commission basis, and allows payment to be made with the electronic money card 7.

The electronic money terminal 3 is an access terminal which accesses the electronic money card 7, and the electronic money terminal 3 is installed alone or incorporated into an accounting machine (a register). In the figure, only one of them is shown in the member store 2; however, it is also possible to install a plurality of terminals.

The electronic money terminal 3 has a module called a reader/writer performing a short-distance wireless communication with the electronic money card 7, and the electronic money terminal 3 can increase (charge) or decrease (make payment) the amount of value stored in the IC chip of the electronic money card 7 by transmitting money amount change information to the electronic money card 7 from the reader/writer.

The money amount change information is information used for changing the amount of value which is currently stored in the electronic money card 7, and specifies the amount and the distinction between charging and payment.

As will be explained in detail later, the money amount change information can be configured as an addition/subtraction command which adds or subtracts the amount added to or subtracted from the electronic money card 7 to or from the value balance, or can be configured as an overwrite command which allows the amount obtained after addition or subtraction to be written over the electronic money card 7 as the value balance.

When payment processing is performed, the electronic money terminal 3 generates payment object information in which the contents of payment are recorded, and transmits it to the member store server 4 immediately in real time. The payment object information is generated irrespective of means of payment (cash, value, or the like).

Incidentally, the electronic money terminal 3 can be configured so as to accumulate the payment object information for a certain period of time and transmit it to the member store server 4 in bulk with batch processing.

The payment object information includes a terminal ID of the electronic money terminal 3, a transaction sequence number, a date and time of processing, information on an object of payment (a payment object code, the amount of payment, etc.), information on the method of payment (cash, electronic money, etc.), and information on the user (sex, age, etc.) guessed by a cashier.

Here, the transaction sequence number is a consecutive number (a serial number) issued by the electronic money terminal 3 every time it performs account processing (such as charging and payment made with value or in cash), and the account processing can be identified based on the terminal ID of the electronic money terminal 3 and the transaction sequence number. Therefore, a combination of the terminal ID and the transaction sequence number functions as account processing identification information for identifying the account processing.

Incidentally, this form of issuance of the transaction sequence number is described as an example; for example, it can be issued on a member store-by-member store basis. In this case, a combination of a member store ID and a transaction sequence number functions as the account processing identification information.

In either case, the payment object information has only to include information based on which the account processing can be identified.

As will be described in detail later, the account processing identification information is used by the electronic money server 5 for matching the transaction information and the breakdown information received thereby separately.

The payment object information is analyzed by the member store server 4, and is used for laying in stock, performing an analysis of the customer trend, and the like.

As described above, a system in which a product sales situation is collected and analyzed by using the payment object information is sometimes called a POS system (Point of Sale system).

On the other hand, the electronic money terminal 3 accumulates transaction information in which the contents of processing performed with the electronic money card 7 is recorded, and transmits it to the electronic money server 5 with batch processing about once a day, for example.

The transaction information includes a terminal ID of the electronic money terminal 3, a transaction sequence number, a date and time of processing, an electronic money function part ID which is ID information of the electronic money card 7, a distinction between charging and payment, the amount charged or the amount of payment, and the like.

The member store server 4 is connected to each electronic money terminal 3 of each member store 2 via a network, and collects and accumulates the payment object information quickly from the electronic money terminal 3.

Then, the member store server 4 generates breakdown information after a delay of three days based on the payment object information, the breakdown information indicating the breakdown of the objects of payment whose payments have been made, and transmits it to the electronic money server 5.

In addition to the above, the payment object information accumulated in the member store server 4 is used for many purposes including order placement and data mining.

Incidentally, the embodiment deals with a case in which the breakdown information is transmitted after a delay of three days for ease of explanation. However, there are various types of member stores 2 including a store which has installed a large-scale computer system, a small-scale family type operation, and an automatic vending machine in a remote island. Thus, the timing with which the member store server 4 transmits the breakdown information to the electronic money server 5 varies from one member store server 4 to another; for example, some of them transmit three days' worth breakdown information in bulk once every three days, and others transmit the breakdown information every day.

Since the electronic money server 5 accumulates the breakdown information, the breakdown information may be transmitted with any timing as long as it does not conflict with the operation of the electronic money system 1.

The breakdown information consists of a terminal ID of the electronic money terminal 3, a transaction sequence number, a date and time of processing, a classification of an object of payment whose payment has been made, the amount of payment for each classification, and the like.

As will be described in detail later, classifications of the breakdown information include a normal item (general products), a tax-free item (tax-free articles such as a postage stamp), and a collected item (public utility rates such as water rates).

According to these classifications, the point rate and the commission rate (charges collected from the member store 2 by the management operator of the electronic money system 1 as charges for the usage of the electronic money system 1) are set.

Moreover, it is also possible to record the electronic money function part ID and the amount of payment of the electronic money card 7 used for payment processing in the breakdown information. In this case, when a plurality of electronic money cards 7 are used in one payment processing (for example, when one electronic money card 7 does not meet the amount of payment, and another electronic money card 7 or the mobile phone 8 is used with it), the electronic money function part ID of each electronic money card 7, the classification of the object of payment whose payment has been made with each electronic money card 7, and the amount thereof are recorded.

The electronic money server 5 is a server managing the transaction information, and performs point calculation and other information processing.

The electronic money server 5 is connected to the electronic money terminal 3 and the member store server 4 via a network, receives the transaction information from the electronic money terminal 3 about once a day and stores it, and receives the breakdown information from the member store server 4 after a delay of three days and stores it.

Then, the electronic money server 5 verifies the breakdown information and the transaction information by using the terminal ID, the transaction sequence number, or the like, as a key, and allocates the amount of payment recorded in the breakdown to the electronic money card 7 by a procedure which will be described later.

Then, according to the rules for calculating the point rate set for each breakdown, the electronic money server 5 calculates the number of points given to the electronic money card 7, and notifies the point server 6.

Incidentally, the timing with which the transaction information and the breakdown information are received is described as an example, and it varies from one member store 2 to another. Since the electronic money server 5 checks the match between the transaction information and the breakdown information based on the terminal ID and the transaction sequence number, reception may be performed with any timing.

The point server 6 is a server storing the number of points of the electronic money card 7 having the points card function and managing the accumulation and use of the points.

The point server 6 receives the number of points calculated by the electronic money server 5, and adds the number of points to the point balance of the electronic money card 7.

The point server 6 is connected to an unillustrated point terminal (which is installed in a store or the like where the points can be used), and performs processing such as checking the point number balance or consuming and giving points by communicating with the electronic money card 7 via the point terminal.

Figure 2:
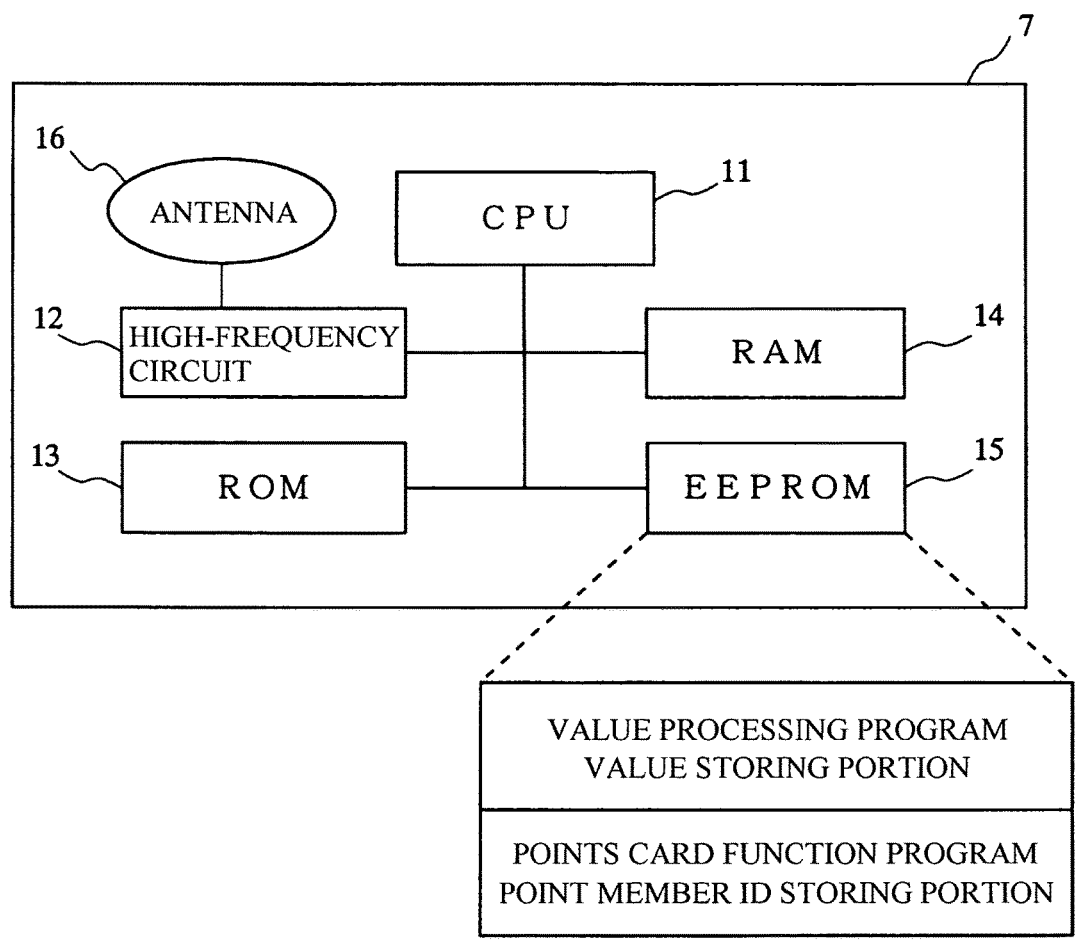
FIG. 2 It is a block diagram of an example of a hardware configuration of an electronic money card.

FIG. 2 is a block diagram showing an example of a hardware configuration of the electronic money card 7.

The electronic money card 7 includes a CPU (central processing unit) 11, a high-frequency circuit 12, an antenna 16, a ROM (read-only memory) 13, a RAM (random-access memory) 14, an EEPROM (electrically erasable and programmable ROM) 15, and the like.

These elements are formed on an IC chip embedded in the electronic money card 7. However, the antenna 16 is formed as an aerial strung near the outer edge inside the electronic money card 7 or on the elliptic curve whose axis is a diagonal line of the electronic money card 7, and is connected at the end thereof to the IC chip.

The CPU 11 is a central processing unit which performs information processing according to various programs stored in the ROM 13 or the EEPROM 15.

Moreover, the CPU 11 can perform short-distance wireless communication with the electronic money terminal 3 and the point terminal (when the electronic money card 7 has the points card function) via the antenna 16 and the high-frequency circuit 12.

The antenna 16 is an antenna for performing short-distance wireless communication with an antenna built into the reader/writer.

In addition, the antenna 16 generates electric power by radio waves from the reader/writer, the electric power used for driving the electronic money card 7.

The high-frequency circuit 12 converts high-frequency waves transmitted from the reader/writer to the antenna 16 into a digital signal and outputs it to the CPU 11, or, conversely, converts a digital signal outputted from the CPU 11 into high-frequency waves and sends them to the reader/writer from the antenna 16.

The RAM 14 is a memory which is writable/readable at any time and offers a working memory used when the CPU 11 performs information processing.

The RAM 14 can retain the memory contents while electric power is supplied to the electronic money card 7, but loses the memory contents when supply of electric power is stopped.

The ROM 13 is a read-only memory in which a basic program for making the electronic money card 7 work, a parameter, data, and the like, are stored.

The EEPROM 15 is a ROM into which information can be written or from which information can be erased. The information stored in the EEPROM 15 is retained even when no electric power is supplied to the electronic money card 7.

The EEPROM 15 stores a value processing program which is a program for making the CPU 11 realize the function as an electronic money card 7 or a points card function program which is a program for making the CPU 11 realize the function as a points card.

In addition, in the EEPROM 15, a value storing portion storing the value balance, the electronic money function part ID, log data on value processing, and the like, and a point member ID storing portion storing a point member ID and the like are formed.

Figure 3:
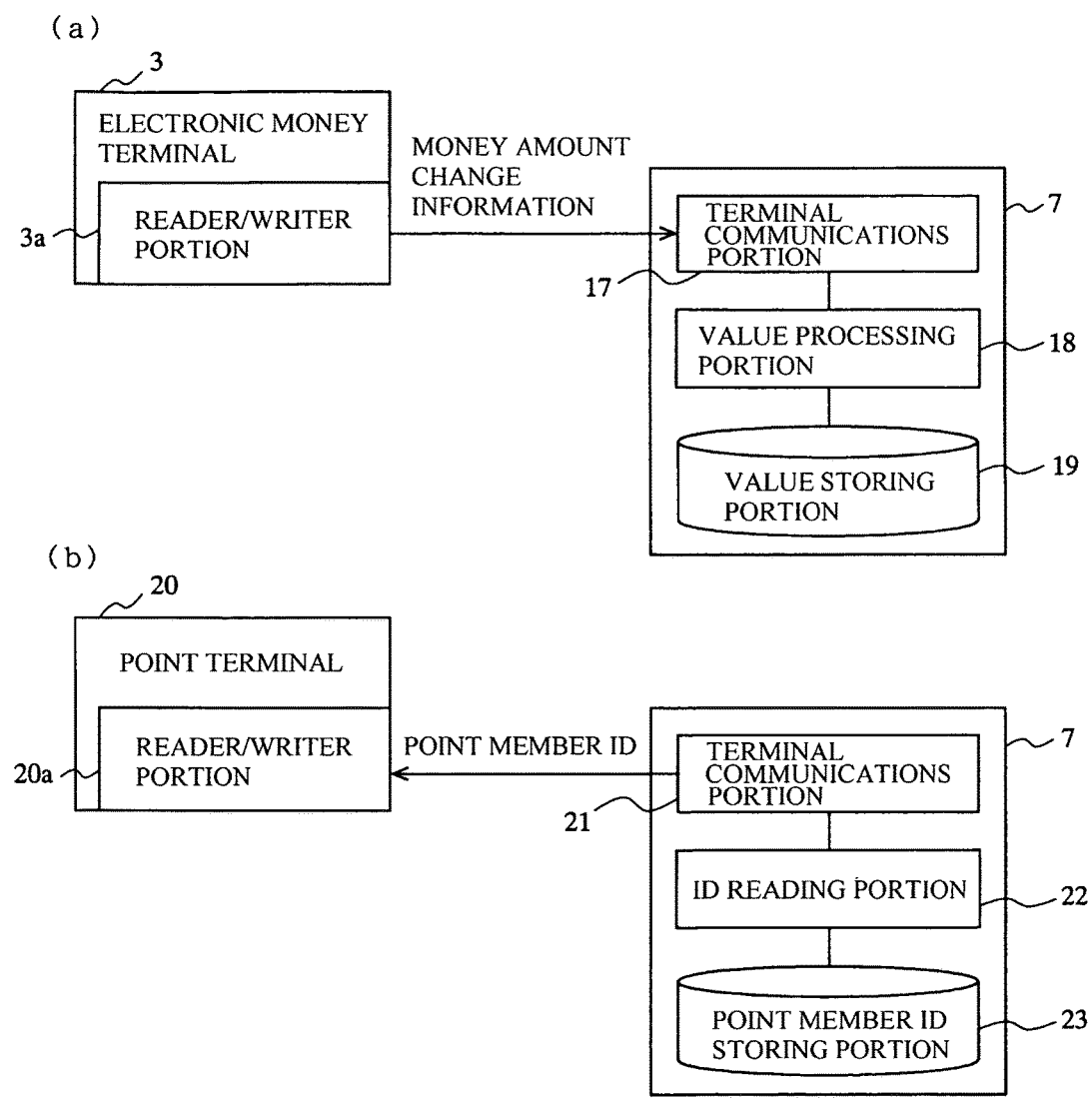
FIG. 3 It is a block diagram for explaining a functional configuration of the electronic money card.

FIG. 3(a) is a block diagram schematically showing a functional configuration realized by the electronic money card 7 when the value processing program is executed in the CPU 11.

A terminal communications portion 17 is formed with the antenna 16 and the like, and receives the money amount change information from a reader/writer portion 3a of the electronic money terminal 3 and inputs it into a value processing portion 18.

The value processing portion 18 performs charging or makes payment by increasing and decreasing the value balance stored in a value storing portion 19 by the amount specified by the money amount change information.

In addition to the above, various commands such as a command for referring to the value balance or a command for referring to the electronic money function part ID are prepared, and the value processing portion 18 performs information processing specified by these commands.

Here, the money amount change information is explained in more detail.

The money amount change information includes an addition command and a subtraction command. The addition command and the subtraction command are accompanied with the money amount as a parameter, and make the value processing portion 18 increase and decrease the value by that money amount.

For example, when the value balance stored in the value storing portion 19 is 5000 yen and the amount of payment is 1000 yen, the electronic money terminal 3 generates a subtraction command which subtracts 1000 yen, and transmits it to the terminal communications portion 17. Then, the value processing portion 18 executes this subtraction command, and changes the value balance stored in the value storing portion 19 to 4000 yen=5000 yen−1000 yen.

Furthermore, it is also possible to configure the money amount change information as an overwrite command.

In this case, the electronic money terminal 3 calculates the value balance after addition or subtraction, and writes the amount thus calculated over the value balance in the value storing portion 19.

For example, suppose that the value balance stored in the value storing portion 19 is 5000 yen and the amount of payment is 1000 yen.

The electronic money terminal 3 reads the current value balance 5000 yen from the electronic money card 7, and calculates the balance after the payment: 4000 yen=5000 yen−1000 yen. Then, the electronic money terminal 3 generates an overwrite command by which 4000 yen is written over the value balance, and transmits it to the terminal communications portion 17. The value processing portion 18 then executes the overwrite command, and changes the value balance stored in the value storing portion 19 to 4000 yen.

The above description deals with a case in which the money amount change information is configured as an addition/subtraction command and a case in which it is configured as an overwrite command; however, it is also possible to combine these commands.

For example, it is possible to use an addition command for charging and use an overwrite command for making payment, or to use an overwrite command for charging and use a subtraction command for making payment.

As described above, the value storing portion 19 forms a monetary value storage medium having ID information (an electronic money function part ID) assigned thereto and storing monetary value as electronic data (value), and the value processing portion 18 forms payment means which performs payment processing by reducing the stored monetary value.

FIG. 3(b) is a block diagram schematically showing a functional configuration realized by the electronic money card 7 when the points card function program is executed in the CPU 11.

An ID reading portion 22 is configured by executing the points card function program in the CPU 11.

A terminal communications portion 21 is formed by using the antenna 16 and the like, and receives an ID read command from a reader/writer portion 20a of a point terminal 20 and inputs it into the ID reading portion 22.

When the ID read command is inputted, the ID reading portion 22 reads a point member ID from a point member ID storing portion 23, and outputs it to the terminal communications portion 21. The terminal communications portion 21 transmits the point member ID to the reader/writer portion 20a.

When the point terminal 20 obtains the point member ID from the electronic money card 7 in this way, the point terminal 20 transmits it to the point server 6, which is not shown, and requests to check the point balance, use the points, or the like.

The point server 6 receives the point member ID from the point terminal 20, refers to the point balance associated with the point member ID, and transmits the balance to the point terminal 20 (when the point balance is referred to) or reduces the points (when the points are used).

As explained above, in this embodiment, it is configured so that the value balance is managed by the electronic money card 7, and the point balance is managed by the point server 6.

Such a form of management is described as an example, and this may be modified so that, for example, the value balance and the point balance are managed by the electronic money card 7, the value balance is managed by the electronic money server 5 and the balance of the points card is managed by the electronic money card 7, or the value balance is managed by the electronic money server 5 and the point balance is managed by the member store server 4.

When the value balance is managed by the electronic money card 7, the electronic money card 7 stores an electronic money function part ID and value by bringing them into correspondence with each other. In this case, a monetary value storage medium having ID information assigned thereto and storing monetary value as electronic data is formed in the electronic money card 7.

Figure 4:
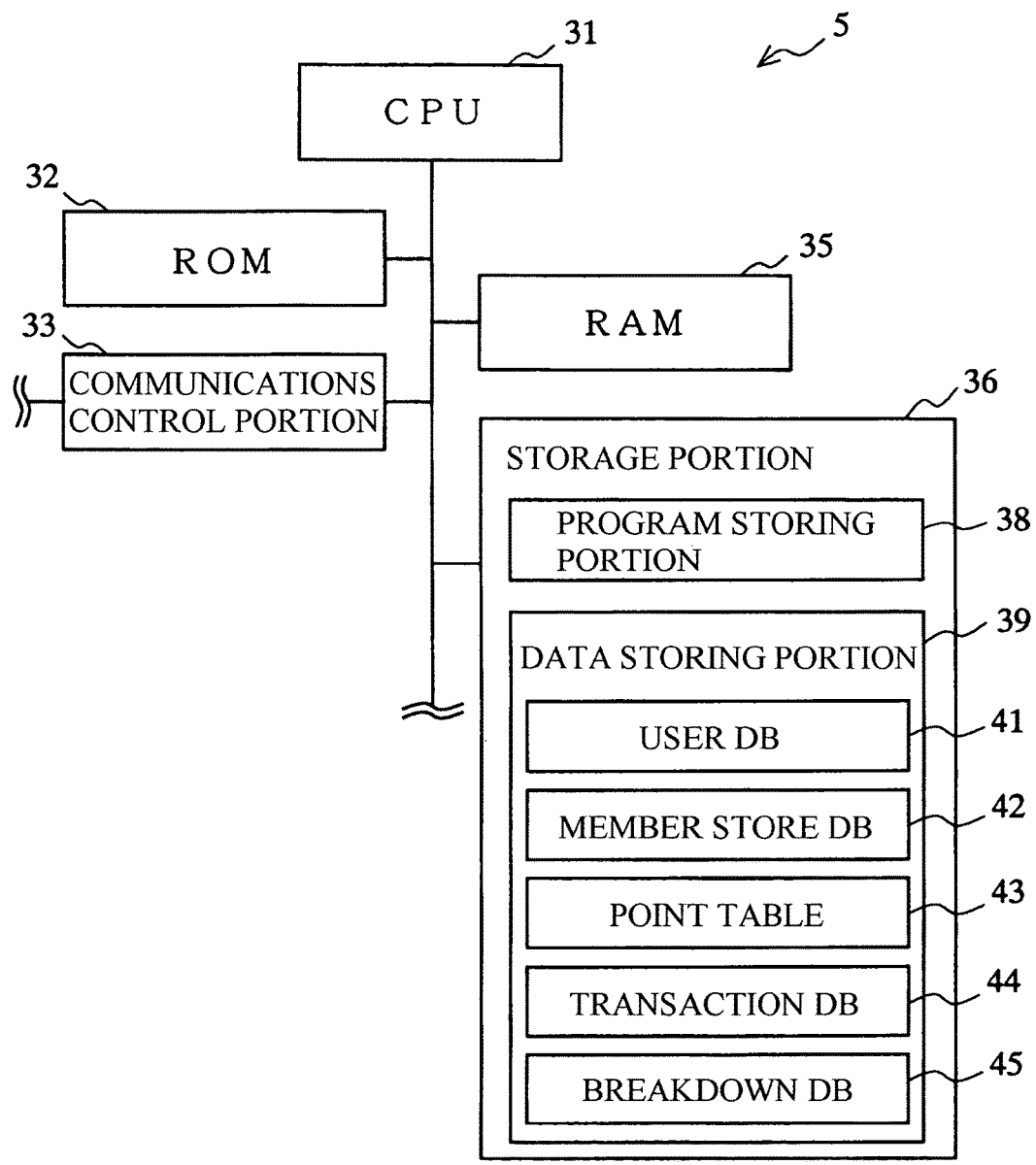
FIG. 4 It is a diagram of an example of a hardware configuration of an electronic money server.

FIG. 4 is a diagram of an example of a hardware configuration of the electronic money server 5.

The electronic money server 5 functions as an information processing device which performs information processing for putting electronic money into circulation, and includes a CPU 31, a ROM 32, a RAM 35, a communications control portion 33, a storage portion 36, and the like, which are connected to one another via a bus line.

The CPU 31 performs various information processing according to a predetermined program. In this embodiment, it calculates the number of points given to the electronic money card 7 by using the transaction information received from the electronic money terminal 3 and the breakdown information received from the member store server 4, and performs other information processing required to operate the electronic money system 1.

The ROM 32 is a read-only memory, and stores a basic program for making the electronic money server 5 work, a parameter, and the like.

The RAM 35 is a readable/writable memory, and performs such operations as offering a working memory to the CPU 31 and loading the program or data stored in the storage portion 36 and storing it.

The communications control portion 33 is a control portion for communicating with the electronic money terminal 3, the member store server 4, the point server 6, and other servers and terminals via the network.

The storage portion 36 is configured by using a large-capacity storage device such as a hard disk, and is composed of a program storing portion 38 storing various programs, a data storing portion 39 storing various data, and the like.

In the program storing portion 38, an OS which is a basic program for making the electronic money server 5 work, a point calculation program for calculating the number of points to be given by using the transaction information and the breakdown information, and other programs are stored.

In the data storing portion 39, a user database 41 in which the user of the electronic money card 7 is registered, a member store database 42 in which information on the member store 2 is stored, a point table 43 in which the relationship between the breakdown and the number of points to be given is defined, a transaction database 44 in which the transaction information is stored, a breakdown database 45 in which the breakdown information is stored, and the like, are stored.

Although the above description deals with the electronic money server 5, the hardware configurations of the electronic money terminal 3, the member store server 4, and the point server 6 are basically the same as that of the electronic money server 5.

FIG. 5 is a diagram of an example of a logical configuration of the user database 41.

The user database 41 consists of items such as "user ID", "name", "electronic money function part ID", and "point member ID".

The "user ID" is ID information for identifying the user of the electronic money card 7. The user ID may be uniquely issued by the electronic money server 5, or can be set by other methods such as using the telephone number of the mobile phone of the user.

The "name" is the name of the user. In the user database 41, in addition to the name, personal information of the user, such as address, telephone number, age, sex, and occupation, can be stored.

The "electronic money function part ID" is an electronic money function part ID of the electronic money card 7 of the user.

For example, when the user has a plurality of electronic money cards 7 such as two electronic money cards 7 and the mobile phone 8 having the electronic money function, the electronic money function part IDs of them are connected to the user ID in the user database 41.

When the electronic money card 7 of the user has the points card function, the "point member ID" is a stored point member ID of the electronic money card 7.

In the example shown in the figure, Ichiro Yamada whose user ID is "012-1123-5869" has three electronic money cards 7 (which may be mobile phones 8) with electronic money function part IDs "123456", "345678", and "987654". Of them, the electronic money card 7 with the electronic money function part ID "123456" has the function as a points card with the point member ID "abcdef".

Incidentally, in the following explanation, the electronic money card 7 with the electronic money function part ID "123456" is abbreviated as a C card, the electronic money card 7 with the electronic money function part ID "345678" is abbreviated as an A card, and the electronic money card 7 with the electronic money function part ID "987654" is abbreviated as a B card.

As will be explained in detail later, the electronic money server 5 calculates the number of points for the electronic money card 7 according to the amount of payment made with value.

Here, since the point member ID and the electronic money function part ID of the electronic money card 7 are in a one-to-one correspondence with each other in the user database 41, the electronic money function part ID can be used as the point member ID.

That is, the electronic money function part ID is brought into correspondence with the value storing portion 19 along with the point member ID.

As a result, the electronic money server 5 forms a point calculating device which gives points according to the amount of payment made with monetary value (value) with the points associated with the ID information (the point member ID or the electronic money function part ID) of the monetary value storage medium (the value storing portion 19) in which the monetary value was stored.

FIG. 6 is a diagram of an example of a logical configuration of the member store database 42.

The member store database 42 consists of "operator", "member store ID", "member store name", "terminal ID", and other items (such as the ZIP code, address, and telephone number of the member store).

In the "operator", the name of an operator (the name of a legal person, a natural person, or the like) managing a member store is stored. Some operators have a plurality of member stores, and others have a single member store.

In the example shown in the figure, the operator "Tokyo Convenience Store Kabushiki Kaisha" operates a plurality of convenience stores, such as the Shibuya branch and the Osaka branch, as member stores.

Incidentally, though not shown, an operator ID is set for each operator for identifying the operator.

In the "member store ID", ID information for identifying each member store is stored.

In the "member store name", the name of the member store is stored.

In the "terminal ID", the terminal ID of the electronic money terminal 3 installed in each member store is stored.

FIG. 7 is a diagram of an example of a logical configuration of the point table 43.

The point table 43 defines the "point rate" and the "commission rate" for each "breakdown classification" of a "normal item", a "tax-free item", and a "collected item".

Objects of payment classified into the "tax-free item" include tax-free articles such as a postage stamp and a fiscal stamp.

Objects of payment classified into the "collected item" include objects of payment collected on behalf of other operators as an agency payment service, such as public utility rates including water rates, electricity rates, and telephone rates, rates paid for home delivery, a payment for a ticket, and the like.

Objects of payment classified into the "normal item" include all the objects of payment such as foods and miscellaneous goods except for the tax-free items and the collected items.

The "point rate" defines the number of points given by the electronic money server 5 when payment is made with the electronic money card 7. In the example shown in the figure, for the "normal item", 1 point is given for every amount of payment of 200 yen, and for the "tax-free item" and the "collected item", no points are given irrespective of the amount of payment.

In addition to the above, for example, it is also possible to set such that, for the "tax-free item", 1 point is given for every amount of payment of 500 yen.

The "commission rate" corresponds to charges the member store 2 pays to a business unit of the electronic money system 1 for the payment made with the electronic money card 7, and it is set at 3% of the amount of payment for the "normal item", is set at 1% for the "tax-free item", and is set at 10 yen per payment for the "collected item".

The above point rate and the commission rate are described as an example, and can be arbitrarily set based on the contract between the point operator and the management operator of the electronic money system 1.

FIG. 8 is a diagram of an example of a logical configuration of the transaction database 44.

In the transaction database 44, transaction information on charging or payment performed with the electronic money card 7 is stored.

The transaction information consists of "electronic money function part ID", "charging", "payment", and other unillustrated items.

The electronic money function part ID is the one that was read by the electronic money terminal 3 when it made access to the electronic money card 7.

The "charging" records a terminal ID of the electronic money terminal 3 at which charging was performed, a transaction sequence number, a processing date and time of charging (for example, it can be specified to the second), the amount of charged value, and the like.

As is the case with the "charging", the "payment" also records a terminal ID of the electronic money terminal 3 at which payment was made, a transaction sequence number, a processing date and time, the amount of value with which payment was made, and the like.

In the example shown in the figure, the C card, the A card, and the B card made payment at the same electronic money terminal 3 (terminal ID "341354") by the same transaction sequence number (00023).

As a result, the electronic money server 5 can judge that these three electronic money cards 7 were used in one payment processing.

According to the transaction information, the amounts of payment made with the electronic money cards 7 are as follows: 800 yen with the C card, 100 yen with the A card, and 600 yen with the B card.

FIG. 9 is a diagram of an example of a logical configuration of the breakdown database 45.

The breakdown database 45 consists of "terminal ID", "transaction sequence number", "date and time", "breakdown", and other unillustrated items.

The "terminal ID" is a terminal ID of the electronic money terminal 3 at which payment was made with the electronic money card 7.

The "transaction sequence number" is a consecutive number assigned by the electronic money terminal 3 to processing performed by the electronic money terminal 3.

The "date and time" is a processing date and time of payment processing, and it can be specified to the second, for example.

The "breakdown" is the amount of payment for each breakdown of an object of payment.

In the example shown in the figure, the breakdown of the payment processing to which the transaction sequence number "00023" was assigned by the electronic money terminal 3 with the terminal ID "341354" is as follows: 600 yen for the "normal item", 500 yen for the "tax-free item", and 400 yen for the "collected item".

The electronic money server 5 can specify the transaction information corresponding to the breakdown information by searching for the transaction database 44 in FIG. 8 by using the terminal ID and the transaction sequence number in the breakdown information as a key, and can judge that this payment was made by using the A card, the B card, and the C card.

Figure 10:
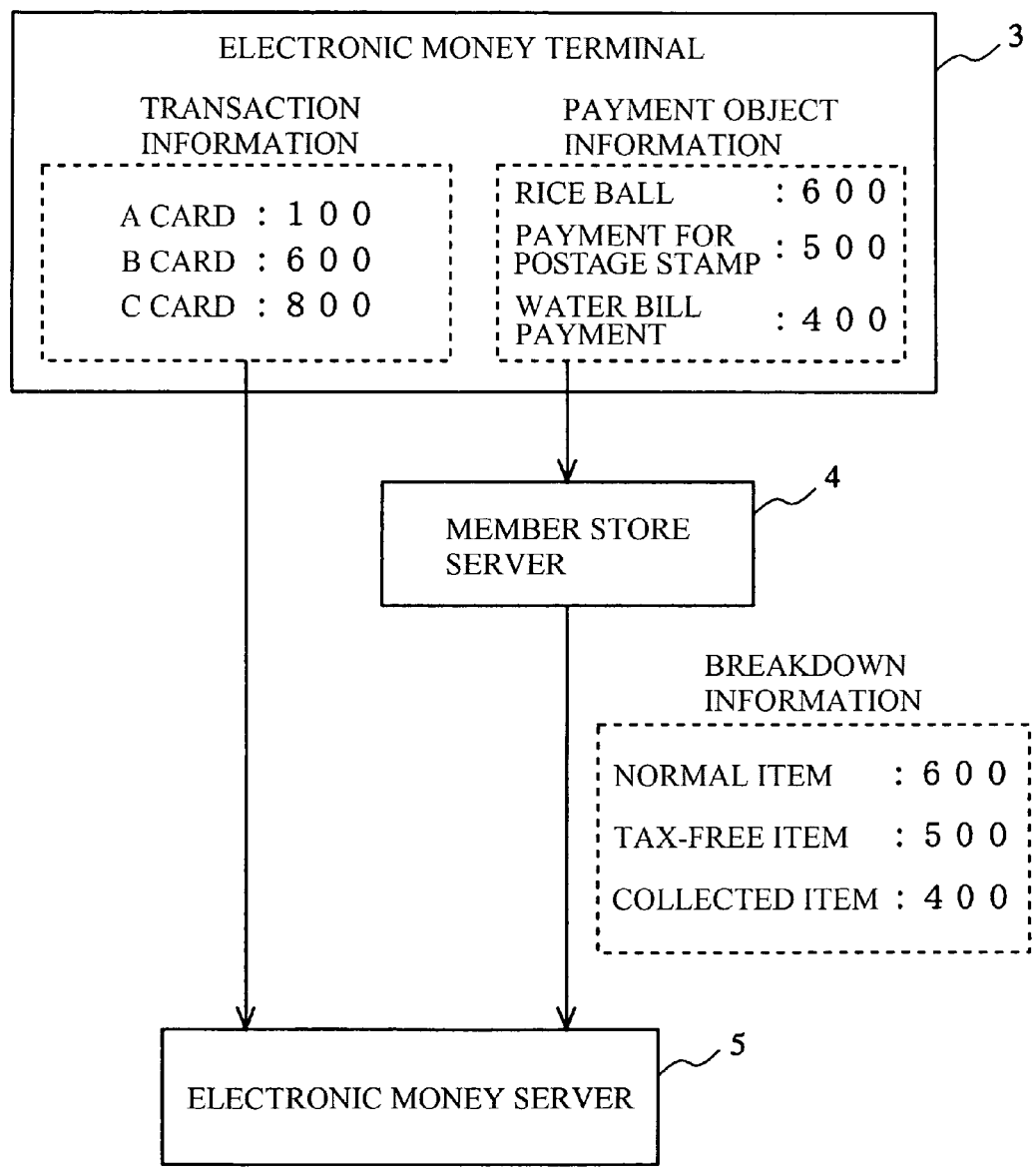
FIG. 10 It is a diagram for explaining a process of receiving transaction information and breakdown information.
Figure 11:
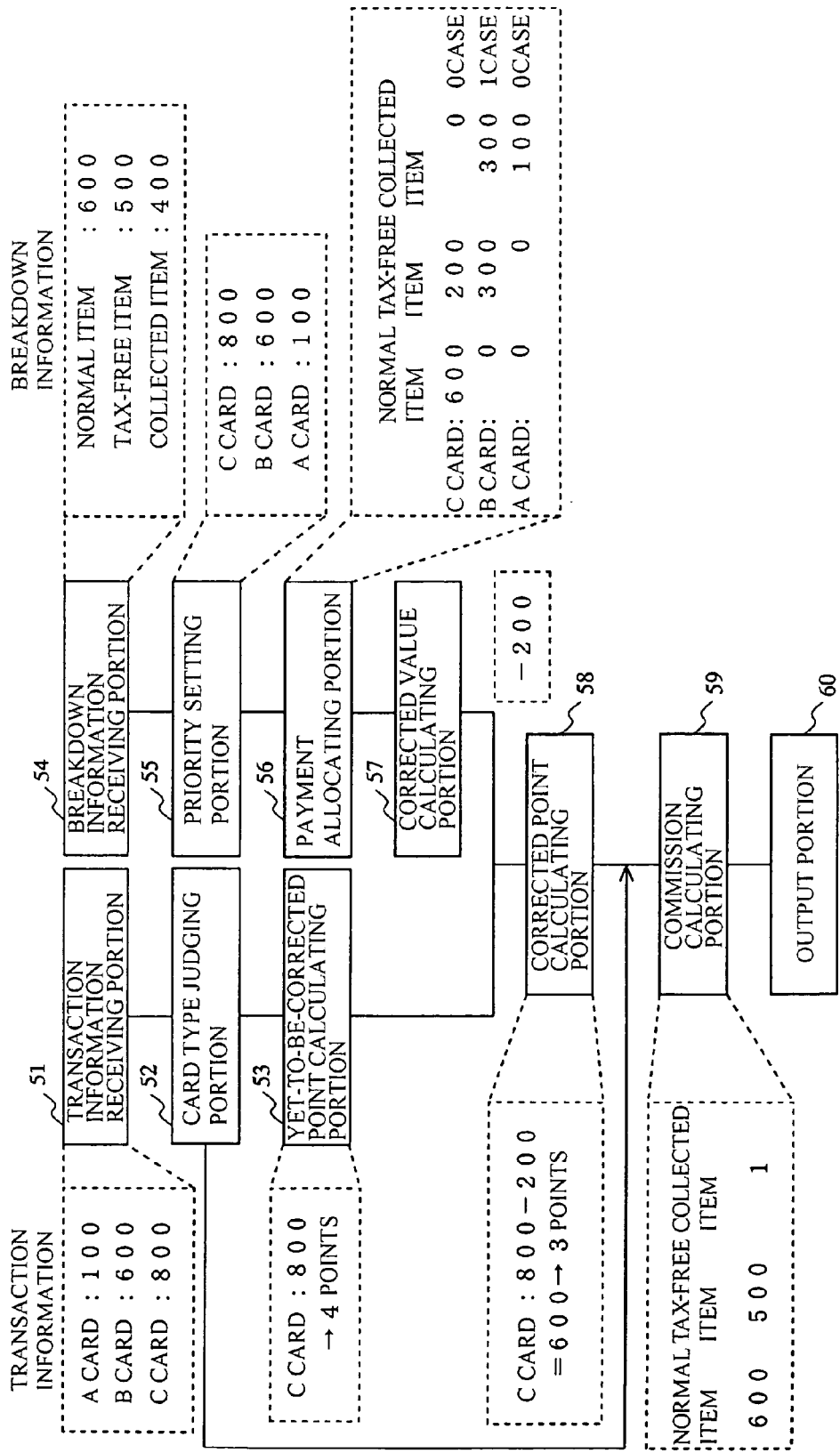
FIG. 11 It is a diagram for explaining point calculation processing.

Next, by using FIGS. 10 and 11, point calculation processing performed by the electronic money server 5 is explained.

First, by using FIG. 10, the process performed by the electronic money server 5 until it receives the transaction information and the breakdown information is explained.

When the user visits the member store 2 and makes payment at the electronic money terminal 3 by using the electronic money card 7, the electronic money terminal 3 generates the transaction information and the payment object information.

By way of example, suppose that the electronic money terminal 3 generates the transaction information to the effect that payment was made such that 100 yen was paid by the A card, 600 yen was paid by the B card, and 800 yen was paid by the C card.

In addition, as for the payment object information, by way of example, suppose that it generates the payment object information indicating that 600 yen was paid for rice balls, 500 yen was paid for postage stamps, and 400 yen was paid for water bill payment.

The electronic money terminal 3 generates the transaction information, temporarily stores it, and transmits it to the electronic money server 5 later with batch processing.

Moreover, as for the payment object information, upon generating it, the electronic money terminal 3 transmits it immediately to the member store server 4.

Upon receiving the payment object information, the member store server 4 stores it in a storage device.

The member store server 4 stores a breakdown table in which the object of payment is associated with the breakdown, for example, a rice ball—an normal item, a payment for a postage stamp—a tax-free item, and a water bill payment—a collected item, generates the breakdown information by checking the payment object information against the breakdown table, and transmits it to the electronic money server 5.

Next, by using FIG. 11, point calculation processing performed by the electronic money server 5 is explained.

The components shown in the figure are each configured by executing the point calculation program, which is stored in the program storing portion 38, in the CPU 31 (FIG. 4).

A transaction information receiving portion 51 receives the transaction information from the electronic money terminal 3, and stores it in the transaction database 44.

The transaction information receiving portion 51 functions as payment amount obtaining means which obtains ID information (an electronic money function part ID) and the amount of payment in the monetary value storage medium to which the ID information is assigned.

Next, a card type judging portion 52 judges whether the electronic money card 7 recorded in this transaction information is an electronic money card 7 having the points card function or not. The electronic money server 5 makes this judgment by checking the electronic money function part ID of the electronic money card 7 against the user database 41.

For the transaction information judged by the card type judging portion 52 as being the payment made with an electronic money card 7 having no points card function, since no points are given to it, a commission calculating portion 59 calculates a commission to be paid by the member store 2 for the payment made with the electronic money card 7, and outputs it to a predetermined file by an output portion 60.

Incidentally, when payment was made by using a plurality of electronic money cards 7, the card type judging portion 52 judges it to be the transaction information by an electronic money card 7 having the points card function, provided that at least one of them is an electronic money card 7 having the points card function.

In the example shown in the figure, the transaction information includes the A card, the B card, and the C card, and, since the C card is an electronic money card 7 having the points card function, the card type judging portion 52 judges it to be the transaction information by an electronic money card 7 having the points card function.

For the transaction information judged by the card type judging portion 52 to be the transaction information by an electronic money card 7 having the points card function, a yet-to-be-corrected point calculating portion 53 calculates the number of points that have yet to be corrected.

The number of points that have yet to be corrected is the number of points that are given on the assumption that all the objects of payment are normal items. Here, regardless of object of payment, calculation is performed at a rate of 1 point for every amount of payment of 200 yen.

In the example shown in the figure, since 800 yen was paid by the C card, the yet-to-be-corrected point calculating portion 53 performs calculation as follows: 800÷200=4 points. Incidentally, a portion which cannot be divided by 200 yen is discarded. For example, when the amount of payment is 900 yen, the result is 4 points.

The number of points calculated by the yet-to-be-corrected point calculating portion 53 and the amount of payment made with the electronic money card 7 (the C card) having the points card function are stored in a predetermined storage area until correction is performed.

On the other hand, a breakdown information receiving portion 54 receives the breakdown information from the member store server 4, and stores it in the breakdown database 45.

The breakdown information receiving portion 54 functions as breakdown information obtaining means which obtains the breakdown information of the object of payment of the obtained amount of payment.

When the electronic money server 5 stores the transaction information and the breakdown information, it brings them into correspondence with each other by using the terminal ID and the transaction sequence number as a key.

In this way, the transaction information and the breakdown information concerning certain payment processing are brought into correspondence with each other.

As described above, the embodiment deals with, by way of example, a case in which the breakdown information and the transaction information are brought into correspondence with each other by using the terminal ID and the transaction sequence number as a key; however, it is not limited thereto. For example, the electronic money server 3 may set ID information of some kind (this ID information is transmitted to the breakdown information) other than the transaction sequence number to the transaction information and the payment object information and establish correspondence by using this ID information, or the point server 6 may include the contents equivalent to the transaction information in the breakdown information (in this case, although there is no need to search for the transaction information because the breakdown information includes the same contents as the transaction information, checking is performed for confirmation).

In either case, any method may be used as long as it can bring the transaction information and the breakdown information into correspondence with each other.

After the transaction information and the breakdown information are brought into correspondence with each other, when a plurality of electronic money cards 7 were used in one payment processing, a priority setting portion 55 sets priorities to the plurality of electronic money cards 7.

Priorities are set first according to the presence or absence of the points card function, and then according to the amount of payment.

Specifically, first, an electronic money card 7 having the points card function is given a higher priority than an electronic money card 7 having no points card function.

Then, among the electronic money cards 7 having the points card function, a card by which a larger amount of money was paid is given a higher priority than a card by which a smaller amount of money was paid.

Similarly, among the electronic money cards 7 having no points card function, a card by which a larger amount of money was paid is given a higher priority than a card by which a smaller amount of money was paid.

In the example shown in the figure, since the C card is an electronic money card 7 having the points card function, it is given a higher priority than the B card and the A card, and, since the amount of money paid by the B card is larger than the amount of money paid by the A card, the B card is given a higher priority than the A card. As a result, the set order of priority is, from highest to lowest, the C card, the B card, and the A card.

According to the above priority setting rules, when one electronic money card 7 was used in one payment processing, regardless of the presence or absence of the points card function and the amount of payment, this electronic money card 7 is given the highest priority.

Next, a payment allocating portion 56 allocates the amount of payment recorded in the breakdown information to each electronic money card 7.

The amount of payment is broken down into the amount of payment to which points are given (in the example shown in the figure, the amount of payment classified into the normal item: 600 yen) and the amount of payment to which no points are given (in the example shown in the figure, the amount of payment classified into the tax-free item and the collected item: 500+400=900 yen).

The payment allocating portion 56 allocates the amount of payment to which points are given first to an electronic money card 7 given the highest priority up to a ceiling of the amount of payment made with the electronic money card 7.

Next, the payment allocating portion 56 allocates, to an electronic money card 7 which does not yet reach the amount of payment after the allocation of the amount of payment to which points are given, the amount of payment to which no points are given up to a ceiling of the amount of payment made with the electronic money card 7.

In this way, the payment allocating portion 56 can allocate the amount of payment to the electronic money card 7 in such a way that the largest possible number of points are given.

In the example shown in the figure, since the amount of payment made with the C card is 800 yen, the payment allocating portion 56 allocates the amount of payment to which points are given, 600 yen, to the C card up to a ceiling of 800 yen.

Suppose that the amount of payment to which points are given is 1000 yen. Then, the payment allocating portion 56 allocates 800 yen to the C card, and allocates the remaining 200 yen to the B card.

Priority may be given to either the tax-free item or the collected item in allocation. Here, priority is given to the tax-free item in allocation, and the payment allocating portion 56 allocates, of 500 yen, 200 yen to the C card and the remaining 300 yen to the B card. Then, the payment allocating portion 56 allocates, of 400 yen paid for the collected item, 300 yen to the B card and the remaining 100 yen to the A card. In this way, it is possible to set allocation priorities to the classifications of the breakdown information.

In addition, the payment allocating portion 56 sets the number of agency payment service cases in the electronic money card 7 to which the largest amount of payment made for the collected item is allocated. For example, the number thereof is one when water bill payment was collected as an agency payment service, and the number thereof is two when water and gas bill payments were collected as an agency payment service. The number of agency payment service cases is recorded in the breakdown information.

According to the above payment amount allocating rules, when one electronic money card 7 is used for payment processing, all of the amount of payment to which points are given and the amount of payment to which no points are given are allocated to the electronic money card 7.

After the amount of payment is allocated to each electronic money card 7 in this way, a corrected value calculating portion 57 calculates a corrected value of the amount of payment used for point calculation by using the amount of payment thus allocated.

When the amount of payment allocated to an electronic money card 7 having the points card function as the object to which points are given is smaller than the amount of payment made with the electronic money card 7, the corrected value calculating portion 57 calculates the difference.

In the example shown in the figure, while the amount of payment allocated to the C card as the object to which points are given is 600 yen, the amount of payment made with the C card is 800 yen. Therefore, the corrected value calculating portion 57 calculates the difference, −200 yen.

A corrected point calculating portion 58 obtains, from the yet-to-be-corrected point calculating portion 53, the amount of payment made with the electronic money card 7 having the points card function and the points that have yet to be corrected, and obtains a corrected value of the amount of payment from the corrected value calculating portion 57.

Then, the corrected point calculating portion 58 corrects the amount of payment of the electronic money card 7 with the corrected value, and calculates the number of points that have been corrected.

In the example shown in the figure, since the amount of payment of the C card is 800 yen and the corrected value is −200 yen, the corrected point calculating portion 58 calculates the number of points given to 600 yen=800−200 at a rate of 1 point for every 200 yen. In this example, 600÷200=3 points.

In this way, the number of points given to the amount of payment made with the C card is corrected from 4 points to 3 points.

After the points are calculated in this way, the commission calculating portion 59 calculates a commission.

According to the point table 43, it is set at 3% of the amount of payment for the normal item, is set at 1% of the amount of payment for the tax-free item, and is set at 10 yen per payment for the collected item. Therefore, in the example shown in the figure, 600×0.03+500×0.01+1×10=33 yen.

The output portion 60 outputs the number of points thus calculated to a predetermined file with the number of points associated with an electronic money function part ID.

After this, the electronic money server 5 searches the user database 41 for a point member ID of the electronic money card 7, brings the point member ID into correspondence with the number of points that have been corrected, and transmits it to the point server 6.

As described above, the yet-to-be-corrected point calculating portion 53, the payment allocating portion 56, the corrected value calculating portion 57, and the corrected point calculating portion 58 function as point calculating means which identifies the amount of payment to which points are given by using the obtained breakdown information and calculates points for the amount of payment thus identified.

Then the output portion 60 functions as point outputting means which outputs the calculated points with the points associated with the ID information.

Moreover, in the electronic money system 1, a first type monetary value storage medium (the value storing portion 19 of the electronic money card 7 having the points card function) to which points are given when payment is made and a second type monetary value storage medium (the value storing portion 19 of the electronic money card 7 having no points card function) to which no points are given even when payment is made are used, and, when the first type monetary value storage medium and the second type monetary value storage medium are both used in one payment processing, the point calculating device allocates, up to a ceiling of the amount of payment made with the first type monetary value storage medium, the identified amount of payment to which points are given to the first type monetary value storage medium as the amount paid by it, and calculates points.

The example described above is provided with two lines, of which one is a line for receiving an input from the transaction information receiving portion 51, and the other is a line for receiving an input from the breakdown information receiving portion 54. This is because the transaction information and the breakdown information are received at different intervals, and the number of cases of payment for a tax-free item and a collected item is remarkably small compared to the number of cases of payment for a normal item.

That is, when the transaction information is received about once a day and the breakdown information is received after a delay of three days, delaying processing of other transaction information for very few pieces of transaction information which requires point correction (in addition, it is only three days later that a corrected value can be calculated) is inefficient.

Moreover, the reason the yet-to-be-corrected point calculating portion 53 calculates points and the corrected point calculating portion 58 calculates points again is that the number of pieces of transaction information to which correction is performed is small.

That is, since the great majority of points calculated by the yet-to-be-corrected point calculating portion 53 require no correction, it is more efficient to calculate the points that have yet to be corrected without waiting for a point corrected value to be calculated by receiving the breakdown information.

Figure 12:
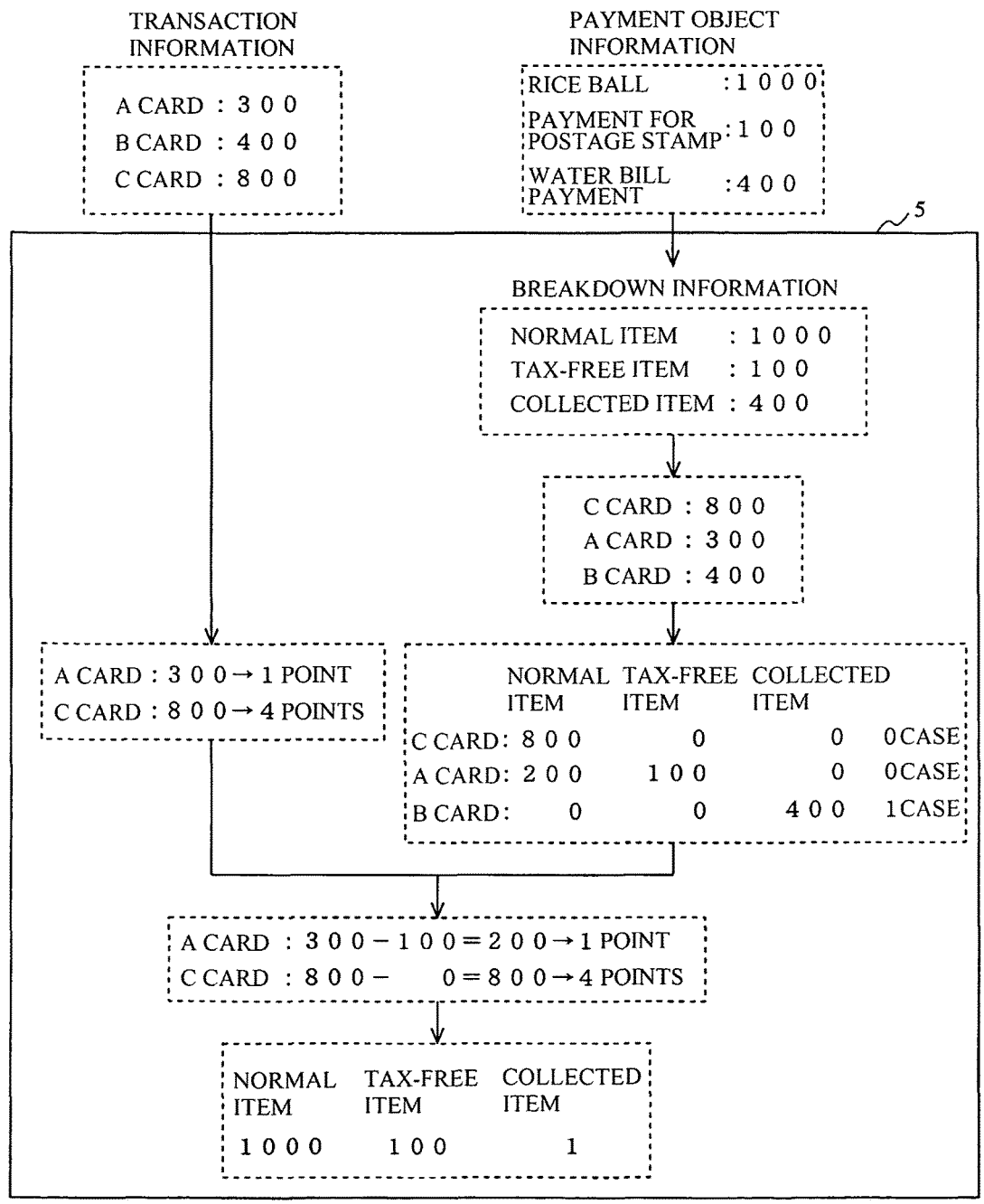
FIG. 12 It is a diagram for explaining another example of point calculation processing.

Next, by using FIG. 12, an example in which two of three electronic money cards 7 are electronic money cards 7 having the points card function is explained.

Suppose that an A card and a C card have the points card function, and a B card does not have the points card function.

Moreover, in FIG. 12, the different functional portions of the electronic money server 5 are omitted.

Suppose that the user paid a total of 1500 yen, 1000 yen for rice balls (a normal item), 100 yen as a payment for a postage stamp (a tax-free item), and 400 yen as a water bill payment (a collected item), by paying 300 yen by the A card, 400 yen by the B card, and 800 yen by the C card.

The electronic money terminal 3 generates transaction information indicating that the A card: 300 yen, the B card: 400 yen, and the C card: 800 yen, and transmits it to the electronic money server 5.

In addition, the electronic money terminal 3 generates payment object information indicating that a rice ball: 1000 yen, a payment for a postage stamp: 100 yen, and a water bill payment: 400 yen, and transmits it to the member store server 4. The member store server 4 generates, from this payment object information, breakdown information indicating that a normal item: 1000 yen, a tax-free item: 100 yen, and a collected item: 400 yen, and transmits it to the electronic money server 5.

In the electronic money server 5, the card type judging portion 52 judges that the A card and the C card have the points card function, and the B card does not have the points card function.

Then, the yet-to-be-corrected point calculating portion 53 calculates the points that have yet to be corrected by using the transaction information as follows: 1 point for the A card and 4 points for the C card.

On the other hand, the priority setting portion 55 sets priorities to the cards. First, since the A card and the C card have the points card function and the B card does not have the points card function, the A card and the C card are given higher priorities than the B card.

Then, since the amount of payment of the C card is larger than that of the A card, the C card is given a higher priority than the A card.

In this way, the order of priority is, from highest to lowest, the C card, the A card, and the B card.

After priorities are set to the cards, the payment allocating portion 56 allocates the amount of payment recorded in the breakdown information to the cards.

First, since the amount of payment of the C card is 800 yen, the payment allocating portion 56 allocates the amount of payment for a normal item to it up to a ceiling of 800 yen. Since the amount of payment for a normal item is 1000 yen, the payment allocating portion 56 allocates, of 1000 yen, 800 yen to the C card.

Next, since the amount of payment of the A card is 300 yen, the payment allocating portion 56 allocates the amount of payment of a normal item to it up to a ceiling of 300 yen.

Since 800 yen of 1000 yen for a normal item has already been allocated to the C card, the payment allocating portion 56 allocates the remaining 200 yen to the A card.

Since the amount of payment of the A card has the capacity to pay 100 yen=300−200, the payment allocating portion 56 allocates the amount of payment for a tax-free item to it up to a ceiling of 100 yen. Since the amount of payment for a tax-free item is 100 yen, the payment allocating portion 56 allocates the amount of payment for a tax-free item, 100 yen, to the A card.

Next, since the amount of payment of the B card is 400 yen, the payment allocating portion 56 allocates the amount of payment for a collected item, 400 yen, to the B card.

Then, for the B card to which the amount of payment for a collected item is allocated, the payment allocating portion 56 sets the number of agency payment service cases at one.

After the amount of payment is allocated to each card in this way, the corrected value calculating portion 57 calculates a corrected value of the amount of payment.

Here, since the amount of payment, 200 yen, allocated to the A card as the object to which points are given is smaller than the amount of actual payment, 300 yen, the corrected value calculating portion 57 calculates the difference, −100 yen, for the A card.

As for the C card, since the amount of payment, 800 yen, allocated thereto as the object to which points are given is equal to the amount of actual payment, 800 yen, the corrected value calculating portion 57 calculates the difference, 0 yen, for the C card.

Next, the corrected point calculating portion 58 corrects the number of points that have yet to be corrected.

As for the A card, since the difference is −100, the corrected point calculating portion 58 performs correction for the A card such that the amount of payment is corrected to 200=300−100, and calculates 1 point as the number of points for this amount.

As for the C card, since the difference is 0 yen, the corrected point calculating portion 58 sets the amount of payment at 800=800−0 for the C card, and calculates 4 points as the number of points for this amount.

Next, the commission calculating portion 59 calculates a commission charged to the member store 2 by using 1000 yen for a normal item, 100 yen for a tax-free item, and one case for a collected item. Specifically, 1000×0.03+100×0.01+1×10=41 yen.

As described above, it is possible to appropriately correct the number of points even when there are a plurality of electronic money cards 7 having the points card function.

The above-described example deals with a case in which no points are given to the amount of payment for an item other than a normal item. For example, when a plurality of point rates are set for objects of payment, such as giving 1 point for every amount of payment of 200 yen for a normal item, giving 1 point for every amount of payment of 500 yen for a tax-free item, and giving 0 point to a collected item irrespective of the amount of payment, the electronic money server 5 allocates the amount of payment, from highest point rate to lowest, to a higher priority electronic money card 7.

Figure 13:
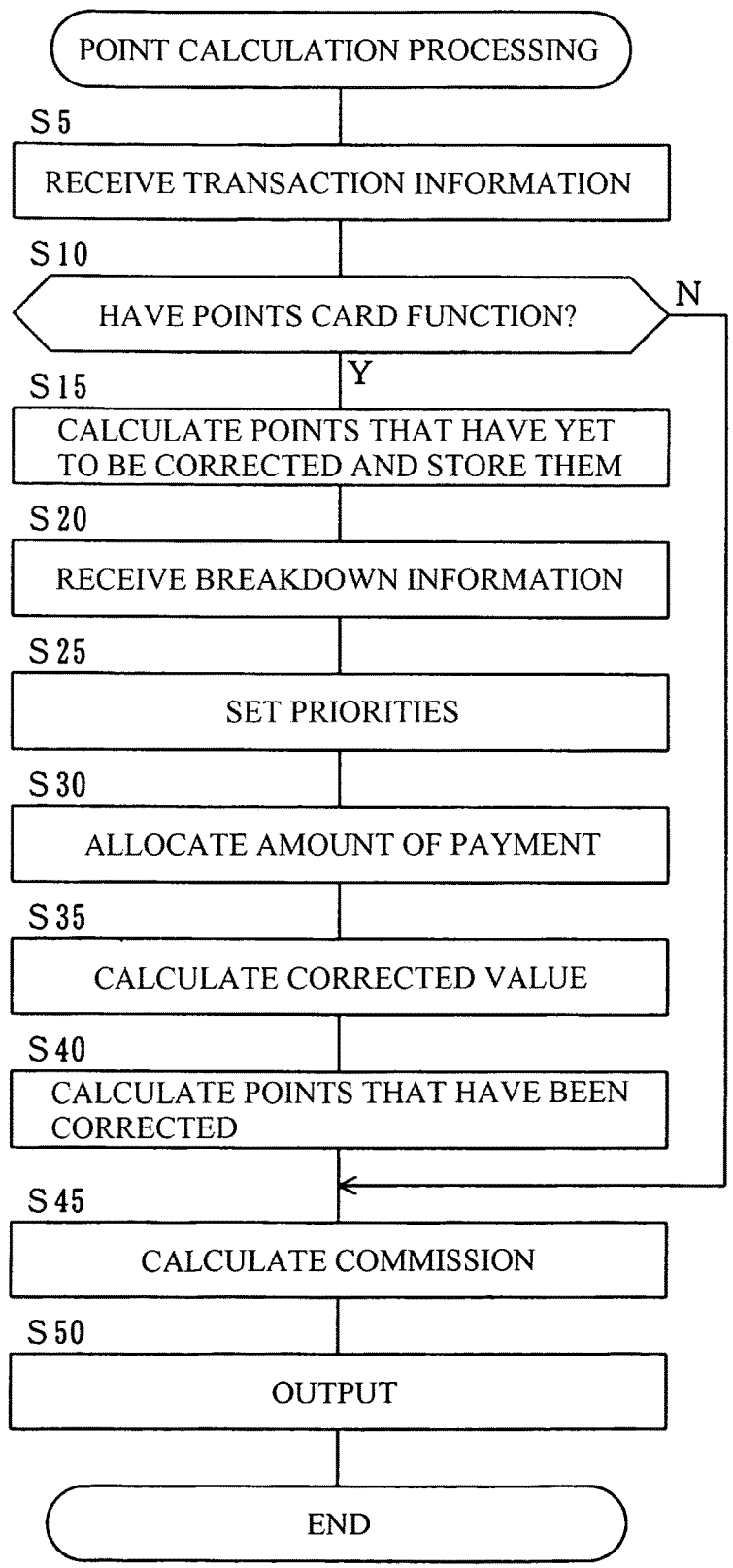
FIG. 13 It is a flowchart for explaining a point calculation procedure.

FIG. 13 is a flowchart for explaining a point calculation procedure by which the electronic money server 5 calculates points.

First, the transaction information receiving portion 51 receives the transaction information from the electronic money terminal 3, and stores it in the transaction database 44 (step 5).

Next, the card type judging portion 52 judges whether the electronic money card 7 recorded in the transaction information has the points card function or not (step 10).

When the electronic money card 7 is found not to be an electronic money card 7 having the points card function (that is, when it is found to be an electronic money card 7 having no points card function) (step 10; N), the electronic money server 5 does not perform point calculation, and the commission calculating portion 59 calculates a commission (step 45) and outputs it to a predetermined file, or the like (step 50).

When the electronic money card 7 is found to be an electronic money card 7 having the points card function (step 10; Y), the yet-to-be-corrected point calculating portion 53 calculates the number of points that have yet to be corrected, and temporarily stores the number of points and the amount of payment of each electronic money card 7 in the storage portion 36, or the like, until the breakdown information is transmitted (step 15).

Next, the breakdown information receiving portion 54 receives the breakdown information from the member store server 4, and stores it in the breakdown database 45 (step 20).

When the breakdown information is stored, the electronic money server 5 checks the match between the transaction information and the breakdown information based on the terminal ID and the transaction sequence number, and brings the transaction information and the breakdown information generated in the same payment processing into correspondence with each other.

After the transaction information and the breakdown information are brought into correspondence with each other, the priority setting portion 55 sets priorities to the electronic money cards 7 used for payment according to the presence or absence of the points card function, and then sets priorities to them according to the amount of payment (step 25).

Next, the payment allocating portion 56 allocates the amount of payment recorded in the breakdown information to the electronic money cards 7 (step 30).

This allocation is performed by allocating the amount of payment for a normal item, a tax-free item, and a collected item, in this order, to them in the order of priority, from highest to lowest, up to a ceiling of the amount of payment made with each electronic money card 7.

Next, the corrected value calculating portion 57 calculates a corrected value of the amount of payment for correcting the number of points (step 35).

This calculation of a corrected value is performed by calculating, when the amount of payment to which points are given (the amount of payment for a normal item) is smaller than the amount of actual payment, the difference between them for each electronic money card 7.

Next, the corrected point calculating portion 58 reads the temporarily stored number of points and amount of payment of each electronic money card 7, corrects the amount of payment by using the corrected value, and calculates the number of points that have been corrected (step 40).

Then, the commission calculating portion 59 calculates a commission (step 45), and the output portion 60 outputs the number of points of each electronic money card 7 and the commission (step 50).

Figure 14:
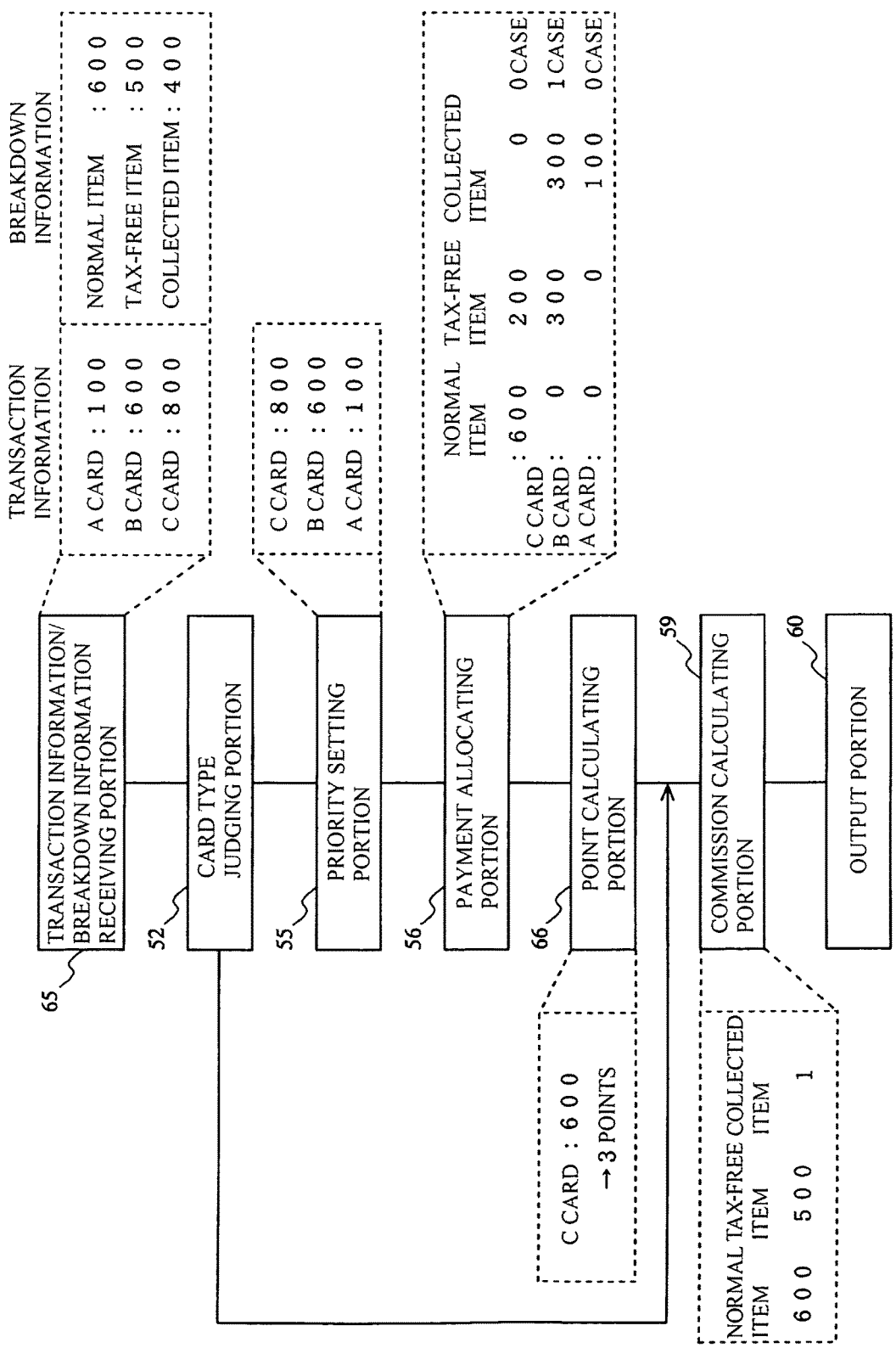
FIG. 14 It is a diagram for explaining a modified example of the embodiment.

Next, by using FIG. 14, a modified example of the embodiment is explained.

In the embodiment explained above, the number of points is calculated based on the transaction information, and the number of points is then corrected by using the subsequently obtained breakdown information; in this modified example, the number of points is calculated without performing correction by performing point calculation after the breakdown information is received.

Such components as find their counterparts in FIG. 11 are identified with the same numerals, and their explanations will be simplified.

Incidentally, the transaction information and the breakdown information are the same as those of FIG. 11, and the C card is an electronic money card 7 having the points card function.

First, a transaction information/breakdown information receiving portion 65 receives the transaction information and the breakdown information, and stores them in the transaction database 44 and the breakdown database 45, respectively.

Incidentally, when the breakdown information includes the contents equivalent to the transaction information, the following processing can be performed by using, in place of the transaction information, the contents which are equivalent to the transaction information and are included in the breakdown information.

Next, the card type judging portion 52 judges whether the electronic money card 7 recorded in the transaction information has the points card function or not, and, when it is found not to have the points card function, the commission calculating portion 59 calculates a commission, and the output portion 60 outputs it.

When at least one of the electronic money cards 7 used for payment has the points card function, the priority setting portion 55 sets priorities to them, and the payment allocating portion 56 allocates the amount of payment to them.

Next, a point calculating portion 66 calculates the number of points by using the amount of payment allocated by the payment allocating portion 56.

Since the C card has the points card function, the point calculating portion 66 calculates 3 points for 600 yen, of the amount of payment of the C card, to which points are given.

After point calculation, the commission calculating portion 59 calculates a commission, and the output portion 60 outputs the number of points and the commission.

This modified example can be used when the difference in the time of reception of the breakdown information and the transaction information is small, for example, when the breakdown information is transmitted to the electronic money server 5 with approximately the same frequency as the transaction information, or when the interval between the times at which points are given is long relative to the interval between the times at which the breakdown information is received, for example, when the number of points is calculated once a month.

Although the above description deals with a case in which payment with the electronic money card 7 is made at the electronic money terminal 3, the same goes for a case in which payment is made by using the electronic money card 7 at a virtual store on the server.

In this case, the user can perform payment processing by installing a reader/writer in a user terminal such as a personal computer and setting the electronic money card 7 in the reader/writer.

Payment processing with the electronic money card 7 is performed by a predetermined server (which may be the electronic money server 5), and the electronic money server 5 can obtain the transaction information from the predetermined server.

In addition, the electronic money server 5 can obtain the breakdown information from a server that operates the virtual store.

Then, the electronic money server 5 can calculate points based on the transaction information and the breakdown information in a manner similar to the embodiment or the modified example.

According to the embodiment and the modified example explained above, it is possible to obtain the following advantage.

(1) It is possible to control the point giving rate depending on an object of payment.

(2) It is possible to allocate the amount of payment to electronic money cards 7 in such a way that, when payment was made by using both an electronic money card 7 having the points card function and an electronic money card 7 having no points card function, the user can earn as many points as possible.

(3) It is possible to obtain the breakdown of the amount of payment recorded in the transaction information based on the breakdown information.

The invention claimed is:

1. An electronic money system comprising:
   at least one electronic money card including a integrated circuit (IC) chip and an antenna, the IC chip having identification information assigned thereto and storing a monetary value in a memory;
   an electronic money terminal located inside a member store, wherein the electronic money terminal includes a reader/writer that accesses the at least one electronic money card, wirelessly reduces the monetary value stored in the IC chip according to an amount of payment made for at least two objects of payment, wirelessly receives the identification information from the at least one electronic money card, generates payment object information for the at least two objects of payment, the payment object information specifying a payment object code and an amount of payment corresponding to the payment object code, and generates respective transaction information for each of the at least two objects of payment, the transaction information specifying the identification information and the amount of payment made for each of the at least two objects of payment;
   a member store server that receives the payment object information from the electronic money terminal located inside the member store, determines, on an object by object basis, whether each of the at least two objects of payment is one of a tax-free item and a collected item, and generates breakdown information that specifies that at least one amount of payment is one of the tax-free item and the collected item;
   an electronic money server that receives the transaction information from the electronic money terminal located inside the member store, separately receives the breakdown information from the member store server, matches the received transaction information to the separately received breakdown information for the at least one electronic money card, and calculates a number of points based on the received transaction information from the electronic money terminal and the received breakdown information from the member store server; and
   a point server that receives the calculated number of points from the electronic money server and accumulates points to provide a points balance for the at least one electronic money card.

2. The electronic money system of claim 1, wherein the electronic money system includes a plurality of electronic money terminals located inside the member store.

3. The electronic money system of claim 1, wherein the electronic money system includes a plurality of member stores each having an electronic money terminal.

4. The electronic money system of claim 3, wherein the plurality of member stores each include a plurality of electronic money terminals.

5. The electronic money system of claim 1, wherein the IC chip is provided in a mobile phone.

6. The electronic money system of claim 1, wherein the electronic money server determines whether the electronic money card is a points card.

7. The electronic money system of claim 1, wherein the electronic money server includes a user database, a member store database, a point table, a transaction database, and a breakdown database.

8. The electronic money system of claim 1, wherein the member store server associates each member store identifier with a plurality of electronic money terminal identifiers.

9. The electronic money system of claim 1, wherein the identification information is stored in read only memory in the IC chip.

* * * * *